United States Patent
Lin

(10) Patent No.: US 11,585,974 B2
(45) Date of Patent: Feb. 21, 2023

(54) LIGHT GUIDE PLATE, OPTICAL STRUCTURE AND ASSOCIATED ELECTRONIC DEVICE

(71) Applicant: Silergy Semiconductor Technology (Hangzhou) LTD, Hangzhou (CN)

(72) Inventor: Suyi Lin, New Taipei (TW)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 86 days.

(21) Appl. No.: 17/198,478

(22) Filed: Mar. 11, 2021

(65) Prior Publication Data

US 2021/0199877 A1    Jul. 1, 2021

Related U.S. Application Data

(63) Continuation of application No. 16/183,290, filed on Nov. 7, 2018, now Pat. No. 10,996,390.

(60) Provisional application No. 62/585,009, filed on Nov. 13, 2017.

(30) Foreign Application Priority Data

Jan. 4, 2018    (CN) .......................... 201810008333.7

(51) Int. Cl.
    *F21V 8/00*      (2006.01)
    *G02B 6/42*      (2006.01)
    *G01J 1/04*      (2006.01)

(52) U.S. Cl.
    CPC .......... *G02B 6/0031* (2013.01); *G01J 1/0425* (2013.01); *G02B 6/0025* (2013.01); *G02B 6/4298* (2013.01); *G02B 6/0018* (2013.01)

(58) Field of Classification Search
    CPC ....... G02B 6/0031; G02B 6/0025; G02B 6/42
    See application file for complete search history.

(56) References Cited

U.S. PATENT DOCUMENTS

| 5,515,244 | A  | * | 5/1996  | Levins ................... | G01D 11/28 |
|-----------|----|---|---------|---------------------------|------------|
|           |    |   |         |                           | 116/202    |
| 5,831,742 | A  | * | 11/1998 | Watson ................    | G01N 21/783 |
|           |    |   |         |                           | 356/325    |
| 6,445,854 | B1 | * | 9/2002  | Miller ....................| G02B 6/262 |
|           |    |   |         |                           | 385/38     |
| 8,019,188 | B2 | * | 9/2011  | Mukoyama ..........        | G02B 6/4206 |
|           |    |   |         |                           | 385/38     |
| 9,361,609 | B2 |   | 6/2016  | Franklin et al.           |            |
| 9,805,630 | B2 |   | 10/2017 | Franklin et al.           |            |
| 2004/0179784 | A1 |   | 9/2004  | Vancoille et al.         |            |
| 2007/0140615 | A1 |   | 6/2007  | Tanaka et al.            |            |
| 2008/0043491 | A1 |   | 2/2008  | Lin                      |            |
| 2009/0232465 | A1 |   | 9/2009  | Ono                      |            |
| 2009/0242370 | A1 |   | 10/2009 | Chiang                   |            |
| 2012/0294579 | A1 |   | 11/2012 | Chen                     |            |

(Continued)

FOREIGN PATENT DOCUMENTS

| CN | 203115851 U | 8/2013 |
|----|-------------|--------|
| CN | 106352903 A | 1/2017 |

*Primary Examiner* — Tina M Wong

(57) ABSTRACT

A light guide plate can include: a first end surface coupled to a reflection surface and a second end surface; where an incident light entering the light guide plate through the first end surface is reflected by the reflection surface and then output from the second end surface; and a diffusion structure configured to increase a transmission path of the incident light in the light guide plate.

19 Claims, 15 Drawing Sheets

(56) References Cited

U.S. PATENT DOCUMENTS

| | | | |
|---|---|---|---|
| 2014/0055408 A1 | 2/2014 | Liu et al. | |
| 2014/0126238 A1 | 5/2014 | Kao et al. | |
| 2014/0136238 A1 | 5/2014 | Simon | |
| 2014/0153281 A1 | 6/2014 | Zhao et al. | |
| 2014/0226361 A1 | 8/2014 | Vasylyev | |
| 2014/0343933 A1 | 11/2014 | Lin | |
| 2015/0016146 A1 | 1/2015 | Yokoyama | |
| 2015/0346414 A1 | 12/2015 | Chang et al. | |
| 2016/0070063 A1 | 3/2016 | Huang | |
| 2016/0109639 A1 | 4/2016 | Kurata | |
| 2016/0341866 A1 | 11/2016 | Guo et al. | |
| 2017/0184778 A1 | 6/2017 | Onda et al. | |
| 2017/0326079 A1 | 11/2017 | Jahnel | |
| 2018/0024289 A1* | 1/2018 | Fattal | G02B 6/0031 362/601 |
| 2018/0156963 A1 | 6/2018 | Fattal | |

\* cited by examiner

LIGHT GUIDE PLATE, OPTICAL STRUCTURE AND ASSOCIATED ELECTRONIC DEVICE

RELATED APPLICATIONS

This application is a continuation of the following application, U.S. patent application Ser. No. 16/183,290, filed on Nov. 7, 2018, which is hereby incorporated by reference as if it is set forth in full in this specification, and which also claims the benefit of Chinese Patent Application No. 201810008333.7, filed on Jan. 4, 2018, and also claims the benefit of U.S. Provisional Application No. 62/585,009, filed on Nov. 13, 2017, both of which are incorporated herein by reference in their entirety.

FIELD OF THE INVENTION

The present invention generally relates to communication technology, and more particularly to light guide plates, optical structures, and associated electronic devices.

BACKGROUND

As shown in FIGS. 1A, 1B and 1C, an example optical structure of the electronic device can include sensor 820 and light guide plate 830. The light receiving surface of light guide plate 830 may be located below the light transmission opening of the frame of the electronic device. The light can enter from the light receiving surface, may transmit through light guide plate 830 to the light emitting surface, and can finally reach sensor 820. This example optical structure can realize a narrow frame of the electronic device, such that the proportion of the display portion can be increased. However, the surface of light receiving surface 810 of light guide plate 830 is a relatively smooth surface, and light of some angles may not be transmitted to the sensor through the light guide plate. In the example of FIG. 1D, the field of view (FOV) of the sensor receiving light may only be ±30°, which may make the field of view of sensor 820 receiving light greatly different from the ideal FOV, thereby reducing the accuracy of sensor 820.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one embodiment, a light guide plate can include: (i) a first end surface coupled to a reflection surface and a second end surface; (ii) where an incident light entering the light guide plate through the first end surface is reflected by the reflection surface and then output from the second end surface; and (iii) a diffusion structure configured to increase a transmission path of the incident light in the light guide plate.

Figure 1A:
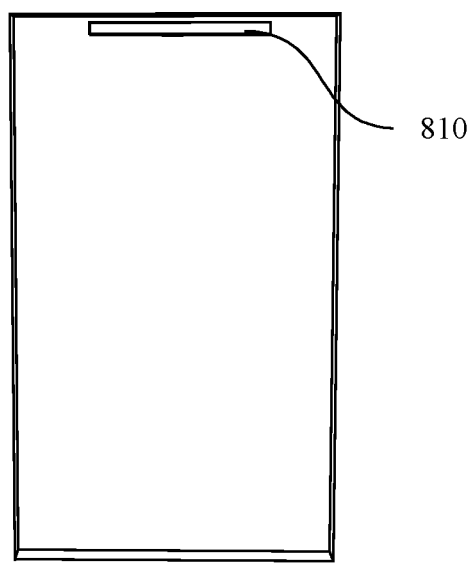
FIGS. 1A and 1B are perspective views of an example electronic device and example optical structure.
Figure 1B:
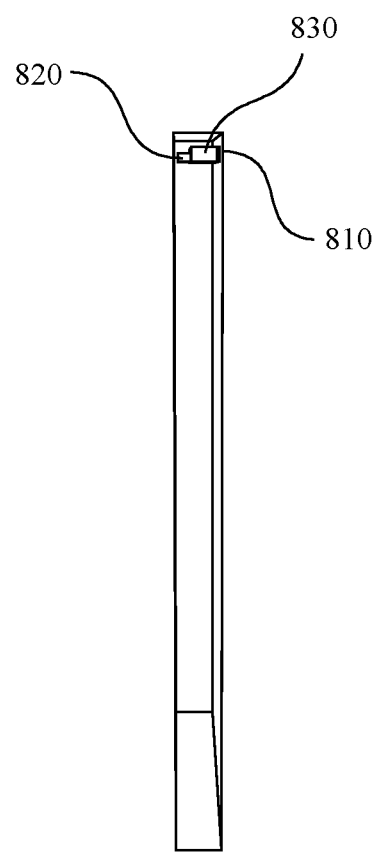
Figure 1C:
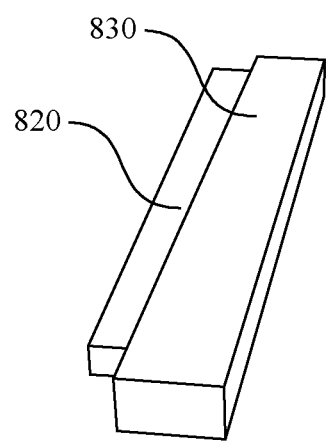
FIG. 1C is a perspective view of an example optical structure.
Figure 1D:
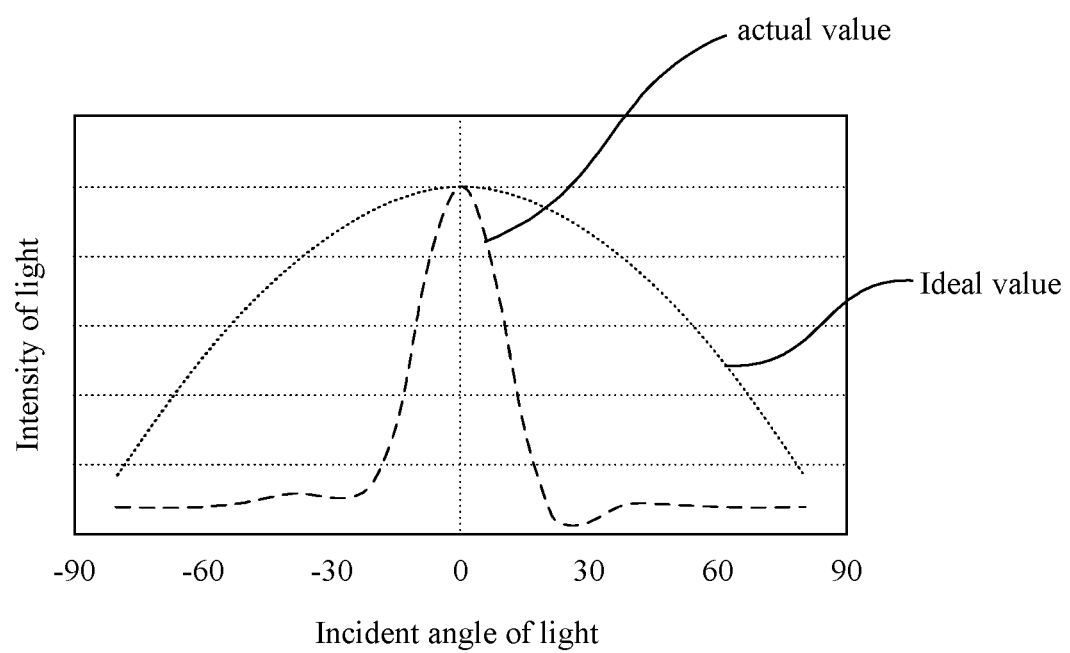
FIG. 1D is an example of the relationship between the incident angle and the light intensity of light entering the example optical structure.
Figure 2A:
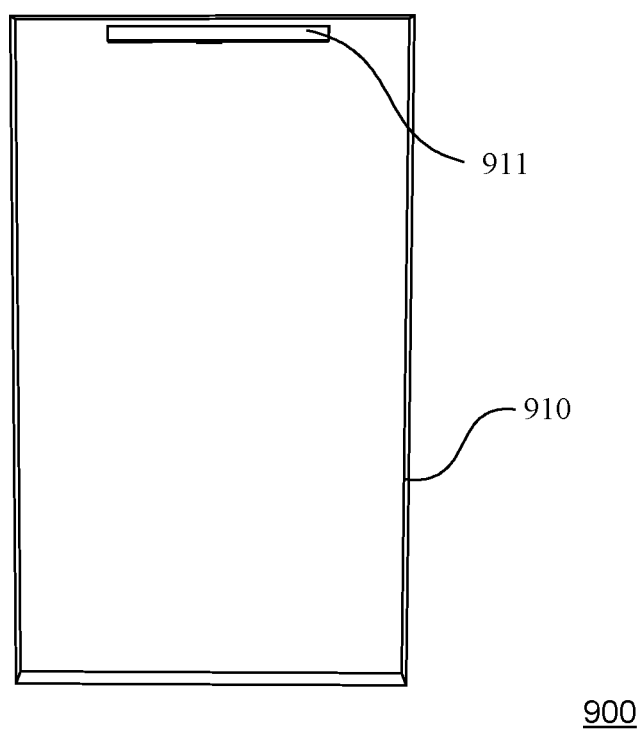
FIGS. 2A and 2B are perspective views of a first example electronic device and optical structure, in accordance with embodiments of the present invention.
Figure 2B:
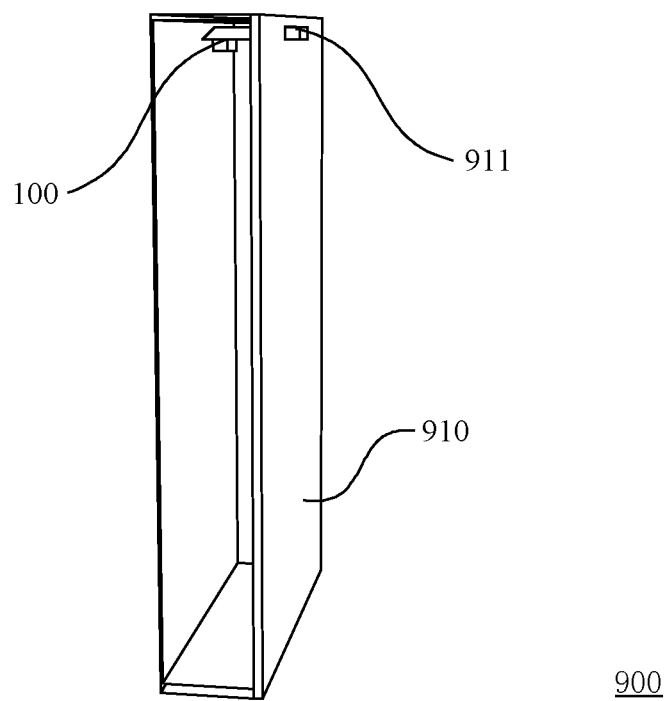
Figure 2C:
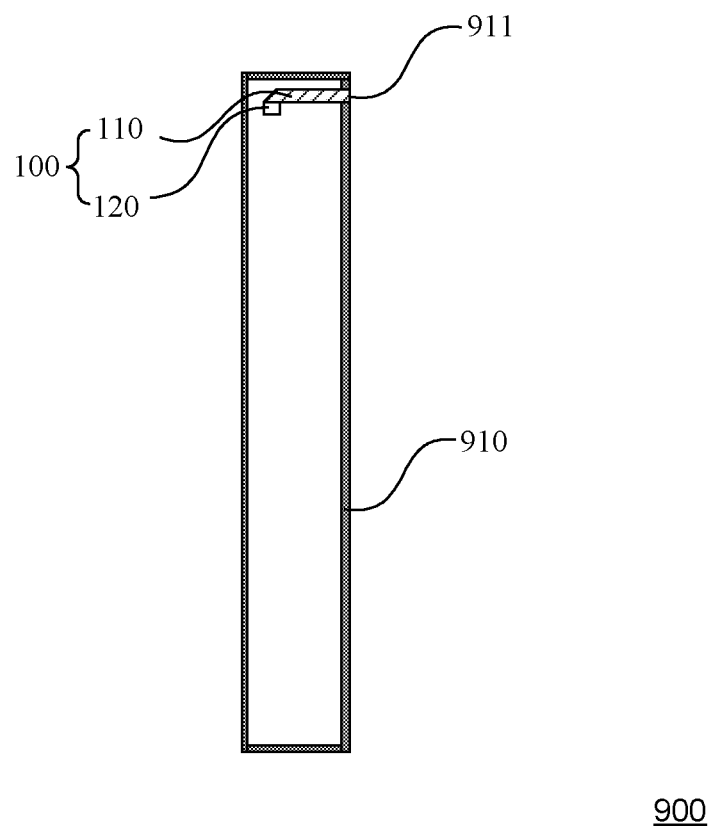
FIG. 2C is a cross-sectional view of the first example electronic device and optical structure, in accordance with embodiments of the present invention.

Referring now to FIGS. 2A and 2B, shown are perspective views of a first example electronic device and optical structure, in accordance with embodiments of the present invention. Referring also to FIG. 2C, shown is a cross-sectional view of the first example electronic device and optical structure, in accordance with embodiments of the present invention. In FIG. 2, electronic device 900 can include housing 910 and optical structure 100. Housing 910 may have light transmission opening 911, which can be located at an upper edge of housing 910. Optical structure 100 can be located inside housing 910, and below light transmission opening 911. Optical structure 100 can include light guide plate 110 and sensor 120. For example, the front surface of electronic device housing 910 may be a transparent glass plate, and an opaque region can be disposed at an edge of the glass plate for shielding the internal device. Light transmission opening 911 may be disposed on the opaque region to enable light to enter sensor 120 inside housing 910 through light transmission opening 911. Also, the light emitted from sensor 120 can be output externally through light transmission opening 911.

Figure 3A:
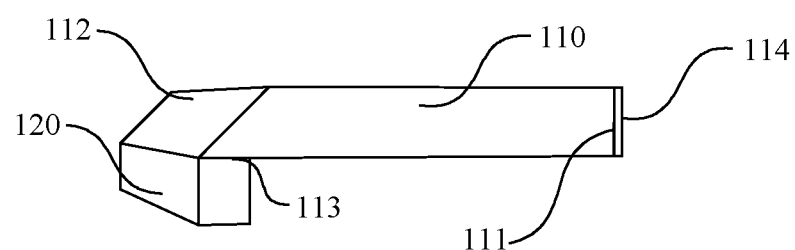
FIG. 3A is a perspective view of the first example optical structure, in accordance with embodiments of the present invention.
Figure 3B:
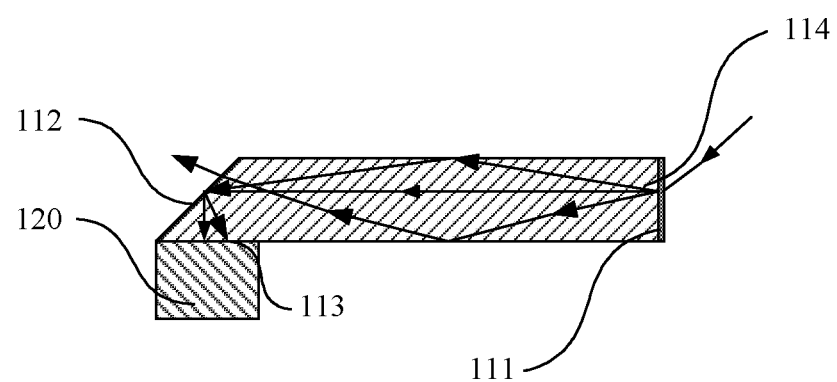
FIGS. 3B, 3C, and 3D are cross-sectional views of the first example optical structure and an example transmission path of light of different incident angles, in accordance with embodiments of the present invention.
Figure 3C:
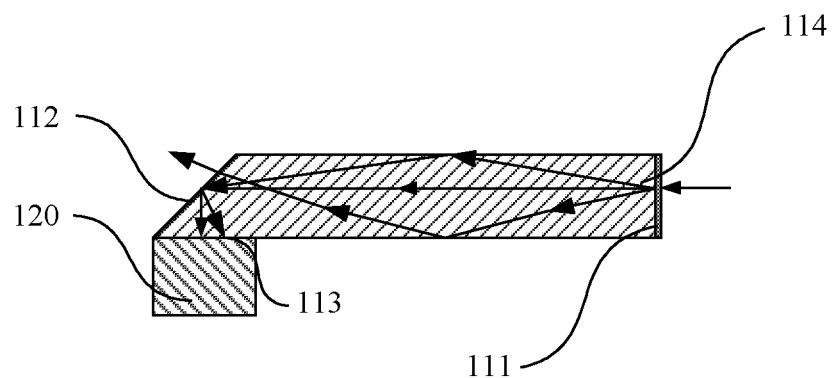
Figure 3D:
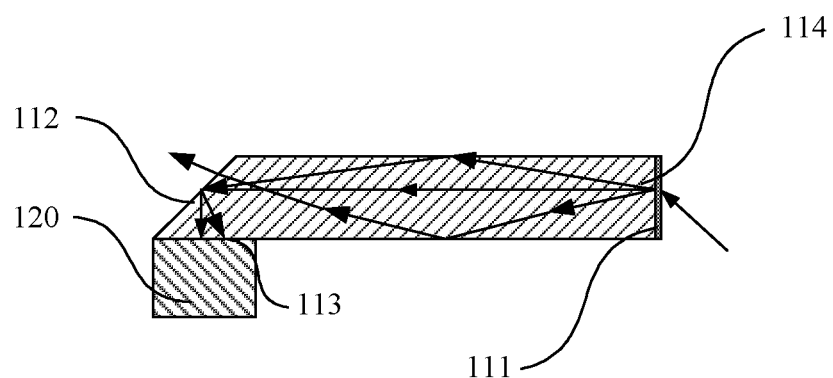

Referring now to FIG. 3A, shown is a perspective view of the first example optical structure, in accordance with embodiments of the present invention. Referring also to FIGS. 3B, 3C, and 3D, shown are cross-sectional views of the first example optical structure and an example transmission path of light of different incident angles, in accordance with embodiments of the present invention. Here, optical structure 100 can include light guide plate 110 and sensor 120. Light guide plate 110 can include end surface 111, reflection surface 112, end surface 113, and diffusion layer 114. Light can be transmitted between end surfaces 111 and 113 through reflection surface 112. For example, the light of the external environment may enter light guide plate 110 through diffusion layer 114 located at end surface 111, can be reflected by reflection surface 112 of light guide plate 110 to end surface 113, and then may be transmitted into sensor 120. Reflection surface 112 can be a flat surface, or other suitable shaped surface, such as a curved surface. Further, the angle between reflection surface 112 and end surface 111 is an acute angle, the angle between reflection surface 112 and end surface 113 is an acute angle (e.g., 45°), and the two acute angles may be mutually complementary angles.

End surface 113 of light guide plate 110 and end surface 111 of light guide plate 110 can be perpendicular to each other. Light can enter light guide plate 110 from end surface 111 be transmitted to reflection surface 112 of light guide plate 110 to perform one reflection and then emitted out from end surface 113. End surface 111 of light guide plate 110 may be disposed below light transmission opening 911. Diffusion layer 114 can scatter light in light guide plate 110. Diffusion layer 114 can be a haze layer formed on light guide plate 110 or an optical diffusion layer. Light guide plate 110 can be made of a material having a refractive index of more than 1. For example, light guide plate 110 can be made of a plastic material having a refractive index of from about 1.4 to about 1.6. Sensor 120 can be located at end surface 113 of light guide plate 110 and can be in close proximity to reflection surface 112 for receiving light transmitting from end surface 113 of light guide plate 110. Sensor 120 can include at least one of an ambient light sensor, a proximity light sensor, and a distance sensor.

In the example of FIGS. 3B, 3C, and 3D, diffusion layer 114 can be located on end surface 111 of light guide plate 110, and light may enter light guide plate 110 from end surface 111 through diffusion layer 114. The light can pass through reflection surface 112 and be reflected, then be transmitted to end surface 113, and may finally reach sensor 120. Diffusion layer 114 located at end surface 111 can increase the light path range entering end surface 111. For example, light that is at an angle with end surface 111 can enter light guide plate 110 through diffusion layer 114 located at the end surface 111, and may be divided into light in a plurality of directions due to the diffuse reflection. Thus, the range of the field of view (FOV) of sensor 120 of optical structure 100 can be increased, and the accuracy of the sensor for light analysis may be improved.

In some examples, diffusion layer 114 can be located on reflection surface 112, or diffusion layer 114 can be located on both reflection surface 112 and end surface 111, such that the light reflected by reflection surface 112 can be scattered to increase the range of the FOV of sensor 120 of optical structure 100. In other examples, diffusion layer 114 may be replaced by adding a diffusion medium in light guide plate 110, or the diffusion medium can be added to the light guide plate with diffusion layer 114. Light guide plate 110 to which the diffusing medium is added can increase the light path entering end surface 111, and the range of the FOV of sensor 120 of optical structure 100 can be increased, such that the accuracy of the sensor for light analysis is improved.

Figure 3E:
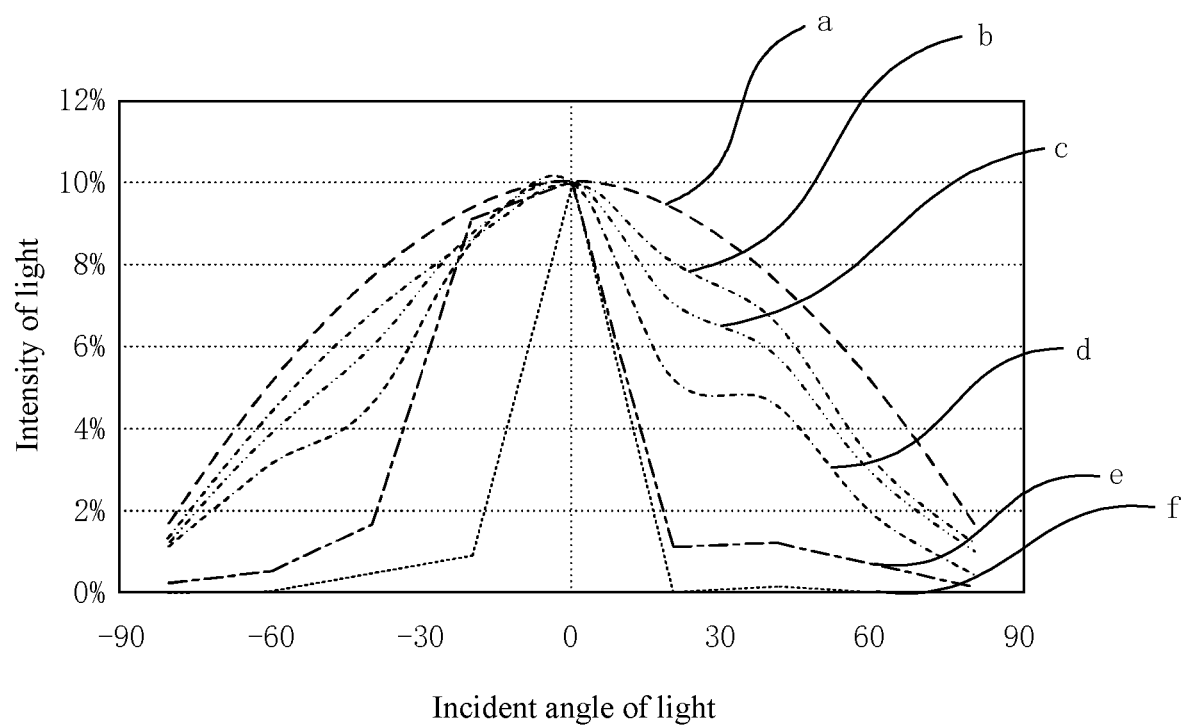
FIG. 3E is an example of the relationship between the incident angle and the light intensity of the light entering the first example optical structure, in accordance with embodiments of the present invention.

Referring now to FIG. 3E, shown is an example of the relationship between the incident angle and the light intensity of the light entering the first example optical structure, in accordance with embodiments of the present invention. In this particular example, the curves a, b, c, d, e, and f respectively represent light intensity curve of an ideal case, a 99% haze surface case, a 95% haze surface case, a 90% haze surface case, a 50% haze surface case, and a smooth surface case. Also, the horizontal axis may indicate the FOV of sensor 120, and the vertical axis may indicate the light intensity. In this example, the higher the degree of haze of end surface 111, the larger the range of the FOV of sensor 120. Further, the haze of end surface 111 of light guide plate 110 can increase the light path to increase the range of the FOV of sensor 120 receiving light. In particular embodiments, light guide plate 110 can introduce light into and out of sensor 120. By installing reflection surface 112 and diffusion layer 114 on light guide plate 110, the range of the FOV of sensor 120 receiving light can be increased without expanding the light transmission opening. The detection accuracy of sensor 120 can be improved, and the associated facilitation of a narrow frame of electronic device 900 may improve the user experience.

Figure 4:
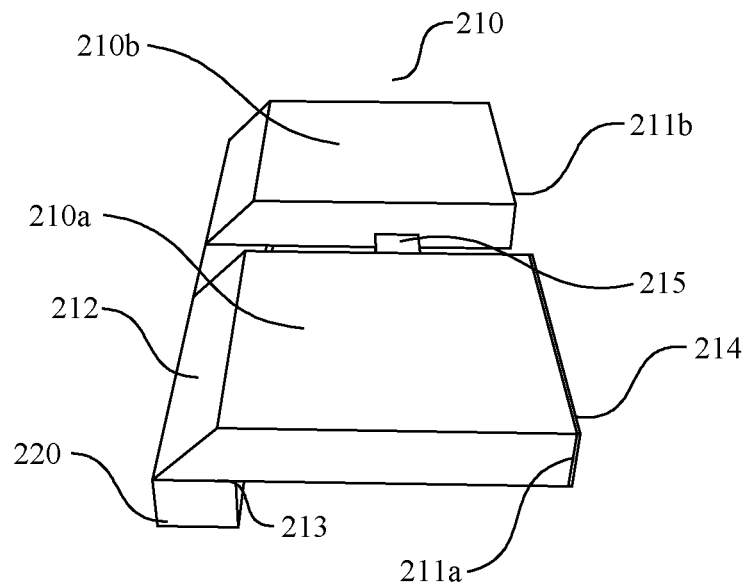
FIG. 4 is a perspective view of a second example optical structure, in accordance with embodiments of the present invention.

Referring now to FIG. 4, shown is a perspective view of a second example optical structure, in accordance with embodiments of the present invention. In this particular example, optical structure 200 can include light guide plate 210 and sensor 220. Light guide plate 210 can include a first end surface, reflection surface 212, end surface 213, and diffusion layer 214. In this particular example, receiving light branch 210a and emitting light branch 210b may be included in the optical structure. The first end surface of light guide plate 210 can include receiving light portion 211a and emitting light portion 211b. Receiving light portion 211a can be included by receiving light branch 210a, and emitting light portion 211b may be included by emitting light branch 210b. Diffusion layer 214 can be located on at least one of receiving light portion 211a and emitting light portion 211b. In this example, diffusion layer 214 can be located on receiving light portion 211a, and emitting light portion 211b and reflection surface 212 may be smooth surfaces.

In this example, when sensor 220 of optical structure 200 is both an ambient light sensor and a proximity light sensor, or sensor 220 of optical structure 200 is both an ambient light sensor and a distance sensor. The proximity light sensor or the distance sensor can include a light-emitting element. The ambient light sensor can be installed on a position of end surface 213 adjacent to receiving light branch 210a and reflection surface 212 for receiving light emitted from end surface 213. The light-emitting element can be installed on a position of end surface 213 adjacent to emitting light branch 210b and reflection surface 212 for emitting light to end surface 213.

Receiving light branch 210a and emitting light branch 210b can be arranged side by side in the same plane, and receiving light branch 210a may be utilized for receiving external ambient light or light reflected by the object. Emitting light branch 210b may be utilized for transmitting the light emitted by the light-emitting element to an external object. For example, light can enter from the outside into light guide plate 210, pass through diffusion layer 214 of receiving light portion 211a of the first end surface, and be transmitted to the ambient light sensor, such that the range of the FOV of the ambient light sensor receiving light can be increased. In addition, the light emitted by light-emitting element can be emitted from emitting light portion 211b of the first end surface. In order to ensure the FOV of the sensor receiving light, the light emitted from the light-emitting element can be prevented from being reflected by diffusion layer 214 in order to form an interference light source. This can substantially avoid a reflection signal of the actual object from being disturbed and/or misjudged.

Further, receiving light branch 210a and emitting light branch 210b can be arranged side by side in the same plane and may be connected by support column 215. Support column 215 can separate receiving light branch 210a and emitting light branch 210b. As such, the interference between receiving light portion 211a and emitting light portion 211b can be substantially avoided. Also, light emitted from the light-emitting element can be prevented from being reflected by diffusion layer 214 to form an interference light source, thereby preventing the reflection signal of the actual object from being disturbed and possibly causing misjudgment.

Figure 5:
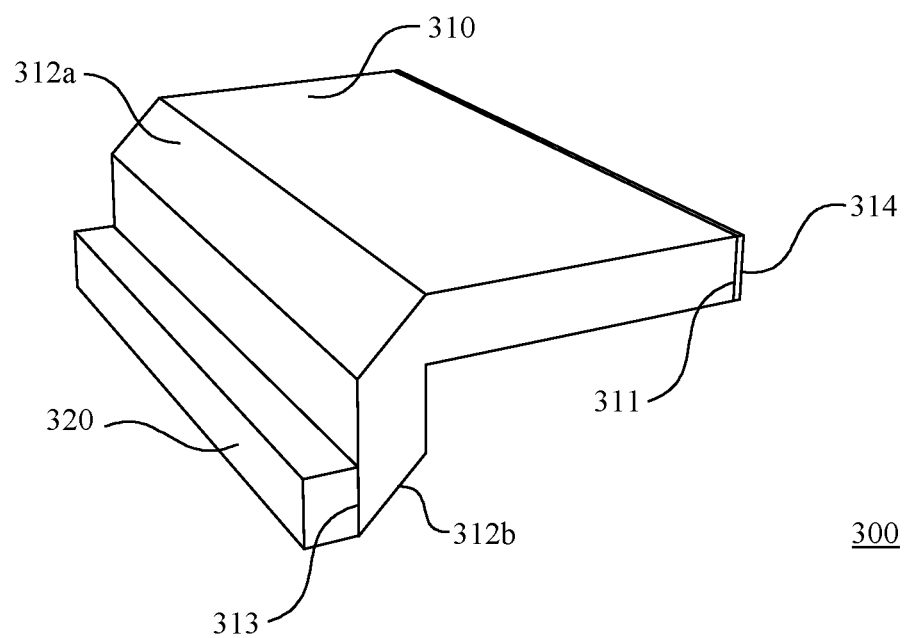
FIG. 5 is a perspective view of a third example optical structure, in accordance with embodiments of the present invention.

Referring now to FIG. 5, shown is a perspective view of a third example optical structure, in accordance with embodiments of the present invention. In this particular example, optical structure 300 can include light guide plate 310 and sensor 320. Light guide plate 310 can include end surface 311, reflection surface, end surface 313, and diffusion layer 314. In this particular example, end surface 313 of light guide plate 310 may be parallel to end surface 311, and reflection surface of light guide plate 310 can include reflection surfaces 312a and 312b. For example, reflection surfaces 312a and 312b can be parallel and opposite to each other. Also, the angle between reflection surface 312a and end surface 313 can be, e.g., 135°, and the angle between reflection surface 312b and end surface 313 can be, e.g., 45°. The light in light guide plate 310 can be reflected by reflection surfaces 312a and 312b, respectively; that is, the light can be reflected twice. The light entering through end surface 311 may be output from end surface 313 after being sequentially reflected by reflection surfaces 312a and 312b.

In this particular example, diffusion layer 314 of light guide plate 310 of optical structure 300 can be located on at least a portion of end surface 311 of light guide plate 310, or can be located on at least a portion of reflection surface 312a or reflection surface 312b of light guide plate 310. This can increase the light path entering end surface 311, and the range of the FOV of sensor 320 of optical structure 300, thereby improving the accuracy of the sensor for light analysis.

Figure 6:
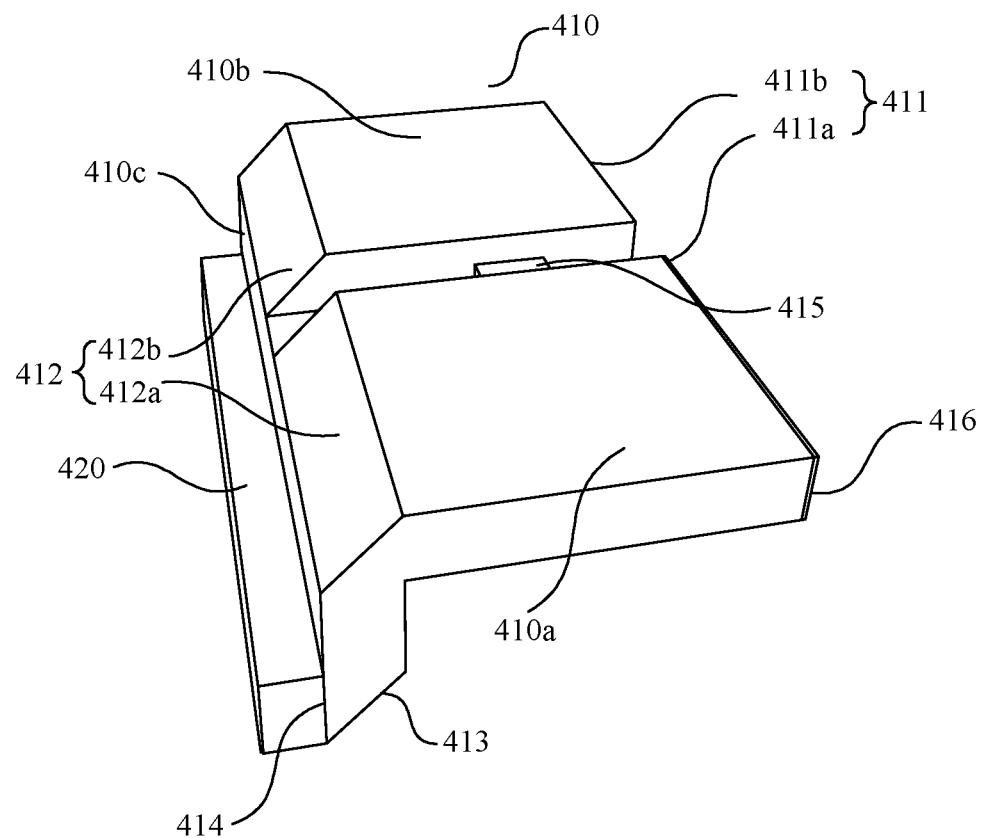
FIG. 6 is a perspective view of a fourth example optical structure, in accordance with embodiments of the present invention.

Referring now to FIG. 6, shown is a perspective view of a fourth example optical structure, in accordance with embodiments of the present invention. In this particular example, optical structure 400 can include light guide plate 410 and sensor 420. Light guide plate 410 can include receiving light branch 410a, emitting light branch 410b, and common body 410c. A first portion of common body 410c can connect to receiving light branch 410a and a second portion of common body 410c can connect to emitting light branch 410b. Further, receiving light branch 410a can be integrally formed with a first portion of common body 410c, and emitting light branch 410b may be integrally formed with a second portion of common body 410c. End surface 411 of light guide plate 410 can include receiving light portion 411a by receiving light branch 410a, and emitting light portion 411b by emitting light branch 410b (collectively, end surface 411). Reflection surface 412 of light guide plate 410 can include portion 412a on receiving light branch 410a, and portion 412b on emitting light branch 410b (collectively, reflection surface 412).

Reflection surface 413 and end surface 414 of light guide plate 410 can be included in common body 410c. For example, and surface 414 may be parallel to end surface 411. Reflection surface 412 can be parallel to and opposite to reflection surface 413, and the angle between reflection surface 412 and end surface 414 is, e.g., 135°, while the angle between reflection surface 413 and end surface 414 is, e.g., 45°. The light entering light guide plate 410 from end surface 411 can be sequentially reflected by reflection surface 412 and reflection surface 413, and outputted from end surface 414. In some examples, the light can also enter light guide plate 410 from end surface 414, be sequentially reflected by reflection surface 413 and end surface 411, and then be outputted from end surface 411. Diffusion layer 416 can be installed on at least one of receiving light portion 411a and emitting light portion 411b of end surface 411. In this example, diffusion layer 416 is installed on receiving light portion 411a.

For example, when sensor 420 of optical structure 400 is both an ambient light sensor and a proximity light sensor, or sensor 420 of optical structure 400 is both an ambient light sensor and a distance sensor, the sensor can include a light-emitting element, and the ambient light sensor can be installed on a position of end surface 414 adjacent to receiving light branch 410a and reflection surface 412 for receiving light emitted from end surface 414. The light-emitting element can be installed on a position of end surface 414 that is adjacent to emitting light branch 410b and reflection surface 412 for emitting light to end surface 414.

Receiving light branch 410a and emitting light branch 410b may be arranged side by side in the same plane. Receiving light branch 410a can receive external ambient light, and emitting light branch 410b may transmit light emitted from the light-emitting element to an external object. For example, the light entering from outside into light guide plate 410 can pass through diffusion layer 416 of receiving light portion 411a of end surface 411, and be transmitted to the ambient light sensor, such that the range of the FOV of the ambient light sensor receiving light is increased. The light emitted from light-emitting element can be emitted from emitting light portion 411b of end surface 411. Since emitting light portion 411b has no diffusion layer in this case, the light emitted from the light emitting element can be prevented from being reflected by diffusion layer 416 to form an interference light source, thereby preventing the reflection signal of the actual object from possibly being disturbed and causing misjudgment.

In addition, receiving light branch 410a and emitting light branch 410b can be connected by support column 415. Support column 415 can separate receiving light branch 410a from emitting light branch 410b, thereby avoiding mutual interference between receiving light portion 411a and emitting light portion 411b. This can also prevent the light emitted from the light-emitting element from being reflected by diffusion layer 416 to form an interference light source, thereby preventing a reflection signal of the actual object from potentially being disturbed and causing misjudgment.

In particular embodiments, an optical structure can include a light guide plate and a sensor, and the light path entering a first end surface may be increased by a diffusion layer of the light guide plate. Also, a range of FOV of an optical structure sensor receiving light can be increased, thereby improving the accuracy of the sensor for light analysis. When the sensor of the optical structure is both an ambient light sensor and a proximity light sensor, or the sensor of the optical structure is both an ambient light sensor and a distance sensor, the sensor can include a light-emitting element. The first end surface of the light guide plate can include a receiving light portion and an emitting light portion. The diffusion layer may be located on the receiving light portion, and the emitting light portion and the reflection surface can be relatively smooth surfaces. The light entering into the light guide plate from outside may pass through the diffusion layer of the receiving light portion of the first end surface, and be transmitted to the ambient light sensor, in order to increase the range of FOV of the ambient light sensor receiving light.

Light emitted from the light-emitting element may all be emitted from the emitting light portion of the first end surface. In order to ensure the FOV of the sensor receiving light, the light emitted from the light-emitting element can be prevented from being reflected by a diffusion layer to form an interference light source. This can substantially avoid a reflection signal of an actual object from possibly being disturbed and/or misjudged. In addition, when the diffusing medium is added to the light guide plate, the light path entering the first end face can be increased, and a range of the FOV of an optical structure sensor receiving light may be increased, thereby improving the accuracy of the sensor for light analysis.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A light guide plate, comprising:
   a) a first end surface;
   b) a first reflection surface;
   c) a second reflection surface;
   d) a second end surface;
   e) wherein an incident light entering said light guide plate through said first end surface is reflected by said first and second reflection surfaces and then output from said second end surface;
   f) a diffusion structure for increasing a transmission path of said incident light in said light guide plate; and
   g) wherein said first and second reflection surfaces are directly connected to said second end surface, and wherein said incident light is output from said second end surface after being reflected by said second reflection surface and not passing through said second reflection surface.

2. The light guide plate of claim 1, wherein said diffusion structure comprises at least one of a diffusion layer on a surface of said light guide plate, and a diffusion medium located inside said light guide plate.

3. The light guide plate of claim 1, further comprising:
   a) a receiving light branch, wherein said first end surface comprises a receiving light portion within said receiving light branch; and
   b) and an emitting light branch, wherein said first end surface comprises an emitting light portion within said emitting light branch, wherein light to be emitted enters said emitting light branch through said second end surface, and is emitted from said light guide plate through said emitting light portion.

4. The light guide plate of claim 3, wherein said receiving light branch comprises said diffusion structure.

5. The light guide plate of claim 3, wherein said receiving light branch and emitting light branch are independent and separated from each other.

6. The light guide plate of claim 3, further comprising a support column that connects said receiving light branch and said emitting light branch.

7. The light guide plate of claim 4, wherein said diffusion structure is located on said receiving light portion of said first end surface.

8. The light guide plate of claim 1, wherein said diffusion structure is located on at least portion of said first reflection surface.

9. The light guide plate of claim 1, wherein an angle between said first reflection surface and said second end surface is a first obtuse angle, and an angle between said second reflection surface and said second end surface is a first acute angle.

10. The light guide plate of claim 9, wherein said second end surface is parallel to said first end surface.

11. The light guide plate of claim 1, wherein an angle between said first reflection surface and second end surface is 135°, and an angle between said second reflection surface and second end surface is 45°.

12. The light guide plate of claim 3, further comprising:
   a) a common body, wherein a first portion of said common body is connected to said receiving light branch, and a second portion of said common body is connected to said emitting light branch;
   b) wherein said incident light enters said receiving light branch through said receiving light portion, said emitted light enters said emitting light branch through said second end surface, and exits said light guide plate through said emitting light portion;
   c) wherein said second reflection surface and said second end surface are within said common body; and
   d) wherein said first reflection surface comprises a first portion within said receiving light branch, and a second portion within said emitting light branch.

13. The light guide plate of claim 12, wherein said receiving light branch is integrally formed with said first portion of said common body, and said emitting light branch is integrally formed with said second portion of said common body.

14. The light guide plate of claim 1, wherein said diffusion structure comprises a haze layer formed by processing on said light guide plate.

15. The light guide plate of claim 1, wherein said diffusion structure comprises an optical diffusion layer.

16. An optical structure, comprising the light guide plate of claim 1, and further comprising a sensor that receives said incident light through said second end surface of said light guide plate.

17. The optical structure of claim 3, further comprising a sensor having a light-receiving element and a light-emitting element, wherein said light-receiving element receives said incident light through said second end surface, and said light-emitting element provides said light to be emitted to said second end surface.

18. The light guide plate of claim 1, wherein said diffusion structure is located on at least one of said first reflection surface, said second reflection surface, and said first end surface.

19. The light guide plate of claim 1, wherein said first reflection surface is parallel to said second reflection surface.

* * * * *